Figure 1:
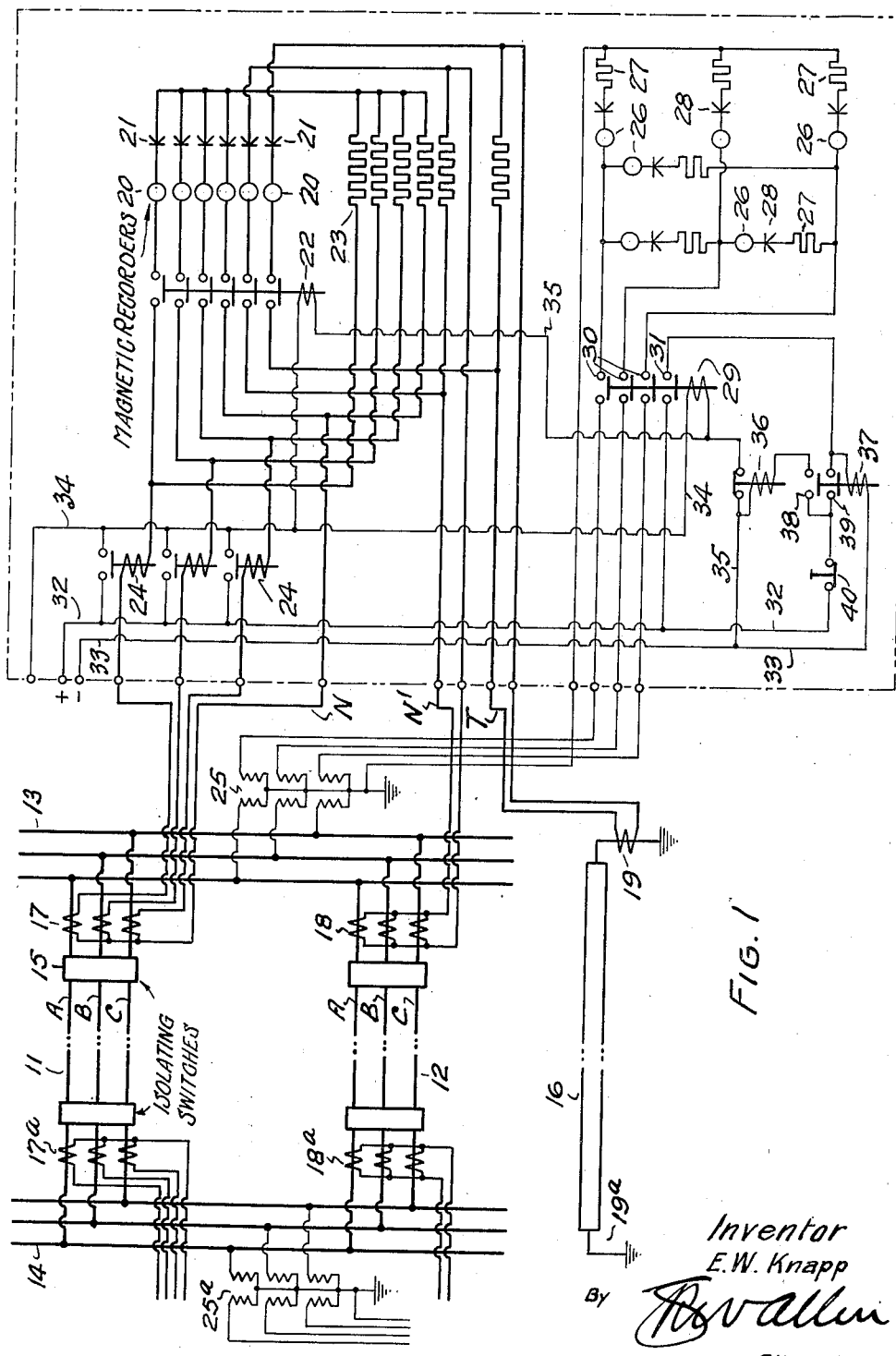

Patented May 20, 1941

2,242,956

UNITED STATES PATENT OFFICE 2,242,956

ELECTRICAL TRANSMISSION LINE FAULT FINDING SYSTEM

Edward W. Knapp, Hampstead, Quebec, Canada, assignor to The Shawinigan Water & Power Company, Montreal, Quebec, Canada, a corporation of the Dominion of Canada Application April 9, 1938, Serial No. 201,200

26 Claims. (Cl. 175—183)

This invention relates to a system of locating faults in electrical transmission lines and the primary object of the invention is to provide a system of permanently supervisory character which will operate automatically to record the effects of both transient and permanent faults in electrical transmission lines, whereby the location of such faults may be very accurately determined in order to expedite inspection of the line at the fault point and repairs thereto if necessary. A further object is to provide a fault locating system applicable to either alternating current or direct current transmission lines of any number of phases and applicable to one or more such lines at one or more points in the length thereof. A still further object is to provide a system as aforesaid which is inexpensive to install and operate. Various other objects and the advantages of the invention may be ascertained from the following description of the invention.

The location, inspection and, if necessary, the repair of faults in electrical transmission lines have always been a serious problem for power companies and are becoming increasingly difficult by reason of the increasing lengths of the lines as power developments are located at progressively greater distances from centres of habitation. The transmission lines are frequently of great length, sometimes several hundred miles, and extend for a large part of their lengths through rough and unsettled country where patrolling is difficult and where the absence of exact knowledge of location of a fault greatly delays the finding and repairing of same. The faults herein dealt with are of two classes, namely; transient faults where only minor damage is suffered and the line can be immediately returned to service without repairs being first necessary; and permanent faults where the damage is such that the line cannot be returned to service until repairs have been made. In the first class may be included the effects of lightning, flashovers due to atmospheric conditions, momentary short circuits due to wind driven matter or swinging conductors and the like. In the second class may be included broken conductors, grounds, sustained short circuits and the like. The effects of transient faults, if not repaired, invite permanent faults and it is therefore almost as important to locate, inspect and, if necessary, repair transient faults as it is to locate and repair permanent faults. According to existing methods, the location of transient faults from a central station is difficult or impossible as the faults may be evident for only a very few seconds or even only a fraction of a second and the information available as to location usually determines it merely as somewhere within a length of several miles of line. Inspection is thus a time-consuming and highly unsatisfactory procedure and quite frequently the fault is never located. Permanent faults are, of course, easily observed but the delay before repairs can be made depends to considerable extent upon the accuracy with which the location of the fault may be determined and advised to repairmen.

Accordingly, the present invention consists in a supervisory system adapted to measure and record, at one or more points in the length of the line, variations in current and potential in the line, thereby to provide data from which the location of a fault may be calculated with close approach to absolute accuracy. Maintaining always the essentials of recording variations of current and potential, the invention includes systems varying considerably in detail arrangement according to the line to be supervised and the conditions to be dealt with. Thus, the invention includes systems operating on either alternating or direct current and adapted to either alternating or direct current lines and to any number of phases; and adapted to supervise a single line or a number of lines; and to measuring and recording effected by any instrumentalities suitable to the arrangement selected within the foregoing range.

In greater detail, the invention consists in all such combinations and arrangements of circuits and instrumentalities and the equivalents thereof as are described herein or illustrated in the accompanying drawings or as lie within the scope of the appended claims.

Figure 2:
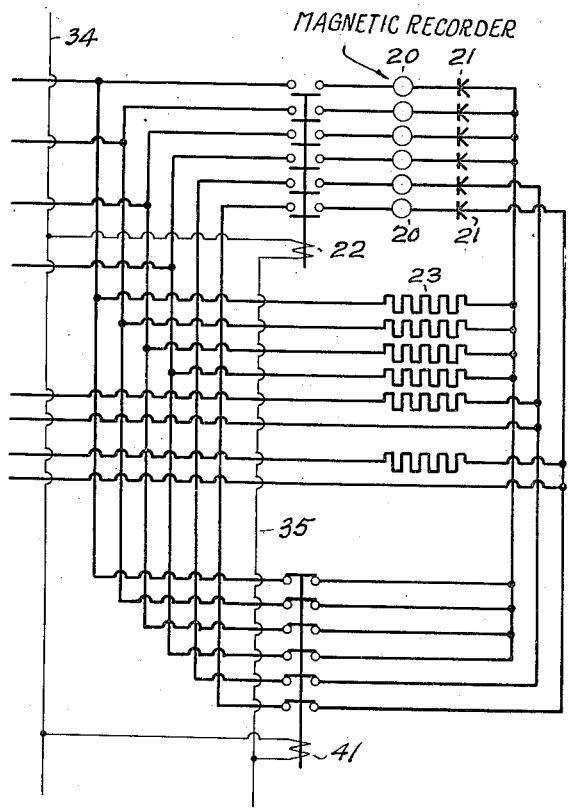

In the accompanying drawings, in which Figure 1 is a circuit diagram and Figure 2 is a diagram of an optional addition, the invention is illustrated as embodied in a direct current recording system connected at one end of and supervising one of a pair of three phase alternating current transmission lines having an associated communication line, but it will be understood the invention is not limited to the particular embodiment illustrated, which embodiment has been selected for purposes of explanation because of its simplicity and because it represents a usual arrangement of present day transmission lines.

Referring more particularly to the drawings, 11 and 12 designate a pair of three phase alternating current transmission lines extending between the buses 13 and 14 of two stations, the conductors constituting the buses and lines being designated A, B and C to distinguish the phases. The usual automatic isolating switches are indicated at 15 and serve to protect the usual station equipment and respective lines in the well known manner. An adjacent circuit, such as a communication circuit, is indicated at 16 and shown as a loop grounded at each end, that is, at the two stations.

The fault locating system of this invention is composed essentially of three portions, namely, current circuits, potential circuits and control circuits. In order to simplify explanation and facilitate understanding, these circuits are illustrated as arranged for locating faults in the line 11 only, but it will be understood the system may be expanded to provide for locating faults in two or more lines, as will be later explained.

Current circuits

As shown in the drawings, each phase of the transmission line 11 is provided with a current transformer 17 and one side of each of these transformers 17 is connected to a neutral conductor N. Each phase of the transmission line 12 is provided with a current transformer 18, which transformers are connected in parallel in a circuit N' which is in effect, the neutral of the line 12. A current transformer 19 is provided in the ground connection of the line 16 and supplies current in a circuit T. For each of the three transformers 17, neutrals N and N' and transformer 19, there is provided a current recording instrument 20 and, if necessary, an associated current rectifier 21 connected in series therewith. A relay 22 is provided having pairs of contacts in series severally between the instruments 20 and the associated current transformers 17 and 19 and the neutrals N and N'. For each of the recording instruments 20 there is provided a resistance 23 shunted with respect to the recording instrument and the rectifier (if any) and the relay contacts in series therewith. For each of the transformers 17 there is provided a fault detecting relay 24 having its winding in series between the transformer and the relay 22. The several series of instrumentalities (24, 22, 20, 21) connected with the transformers 17, i. e., related to the phases A, B and C of line 11, are connected in parallel and are also connected in series with the instrumentalities (21, 20, 22) in series with the neutral conductor N, so that three loops result each including the series of instrumentalities associated with one of the phases A, B or C and the series of instrumentalities associated with the neutral N. The transformers 18 and the transformer 19, together with the instrumentalities 22, 20 and 21 in series with each, are in separate loops isolated from one another and from the previously described loops including the transformers 17.

Potential circuits

For each of the phases of the line there is provided a potential transformer 25 which may be connected to the buses, as shown. The neutral points of these transformers are connected together and to ground. There is provided in series between the phases of the phase pairs A—B, A—C, and B—C and between each of the phases and ground (or neutral) a potential recording instrument 26, a resistance 27 and, if necessary, a rectifier 28 arranged in series, the rectifier being preferably between the recording instrument and the resistance. It will be seen that the phases are star connected. A relay 29 is provided having pairs of contacts 30 in series between the three potential transformers 25 and the associated recording instruments 26, severally. This relay also has an additional pair of contacts 31 in the control circuit hereafter described.

Control circuits

The control circuits comprise conductors 32 and 33 taking current from any suitable power source, (not shown) preferably a direct current source. A conductor 34 is provided to which the windings of relays 22 and 29 are connected in parallel. These relay windings have a common connection 35 to the control circuit, for example, to the conductor 33. A relay 36 is provided having its contacts in the conductor 35 and in series between each of the relays 22, 29 and the conductor 33. One of the relays 22 or 29, for example the relay 29, is provided with contacts 31 connected in series with the winding of a relay 37 across the control circuit 32, 33. This relay 37 has two pairs of contacts 38 and 39. The contacts 38 are arranged in series with the winding of relay 36 across the control circuit and the contacts 39 are arranged in series with the winding of relay 37 across the control circuit, that is, these contacts are in parallel with contacts 31 of relay 29 and serve to establish a second or holding circuit for the relay 37. A resetting switch 40 is provided in series with the contacts 39 and winding of relay 37 in the holding circuit.

The recording instruments 20 and 26, also the rectifiers 21 and 28, may be of any suitable types. The recording instruments now preferred are of the permanently magnetizable, removable core type but the invention is not limited to the use of these as other types of recorders, such as graphic recorders, may be used. When the magnetizable removable core type of recorders are used in connection with a line transmitting alternating current, the rectifiers 21 and 28 are necessary to obtain the direct current required for operation of the recorders, but if the system is applied to a line transmitting direct current, the rectifiers are not required. The rectifiers used may be of any suitable type which will transform alternating current into pulsating direct current, such as the well known copper oxide film type, but other types may be used such as screen-grid tube rectifiers similar to those used in radio.

The transformers 17, 18, 19 and 25 serve merely to step down current and voltage to convenient values avoiding insulation difficulties and enabling use of smaller and less expensive instrumentalities in the system, and it will be understood that in certain cases some or all of the transformers may be dispensed with.

Operation

Under normal line conditions, the three relays 24 and the relays 22, 29 and 37 maintain open circuits at their contacts while the relay 36 and the switch 40 maintain closed circuits at their contacts. Closed circuits exist through the current transformers 17, windings of relays 24 and the associated resistances 23, which serve to hold the relays inoperative. Closed circuits likewise exist respectively through the transformers 18 and their associated resistance 23 and through the transformer 19 and its associated resistance 23. The recording instruments 20 and rectifiers 21 are excluded from these circuits by the open contacts of relay 22. In the potential system and in the control system there are no closed circuits under normal line conditions.

Any fault on the supervised line 11 which disturbs the current balance for even a fraction of a second by more than a predetermined fluctuation is reproduced through the transformers 17 as an unbalancing of the currents flowing through the relays 24, with the result that one or more of them is energized to bridge its contacts and connect the control circuit conductor 32 with the conductor 34, so that the relays 22 and 29 (which are connected in parallel between 34 and 33) are energized and bridge their contacts.

Operation of the relay 22 serves to close the circuits through the recording instruments 20 associated with the line phases and neutral and also through those of the recording instruments 20 associated with the second transmission line 12 and with the adjacent circuit 16. These recorders make separate records of the currents flowing in the three line conductors and in the neutral and further separate records of any induced currents flowing in the lines 12 and 16 as result of the disturbance or fault in line 11.

Operation of the relay 29 serves to close, through its contacts 30, the circuits between the potential transformers and the recording instruments 26 and also serves to close, through its contacts 31, the powering circuit of relay 37. The recording instruments 26 make record of the potential differences between the line phases and between each of them and neutral. Energization of the relay 37 causes it to bridge its pairs of contacts 38 and 39, thus closing, through contacts 38, the powering circuit of relay 36 and through contacts 39 a holding circuit for itself. Relay 36 when energized operates to open the powering circuits of relays 22 and 29 which then open their contacts, so that all the recording instruments 20 and 26 are de-energized and cease to make records. The holding circuit of relay 37 established through its contacts ensures that relay 36 remains energized and holds open the powering circuits of relays 22 and 29 until the records have been taken from the instruments 20 and 26 and the system reset by opening the switch 40. Opening of this switch 40 breaks the holding circuit of relay 39 which then opens and de-energizes relay 36, which then bridges its contacts to restore the powering circuits of relays 22 and 29 in readiness for a further operation.

The relays 36 and 37 are preferably of an adjustable delayed action type, so that after energization of relay 37 a short period of time will elapse before relay 36 is energized and, after energization of relay 36, a short period of time will elapse before it operates to de-energize relays 22 and 29. Thus, by suitably adjusting the timing action of the relays 36 and 37, the period of time during which current and potential records are made may be adjusted to obtain fair averages of currents and potential differences and not merely the first surges which occur at the instant a fault commences. If desired, the relays 22 and 29 may be also of the delayed action type adjustable to avoid recording the first surges following a fault.

If desired, the system may be used to take records at any time without there being any fault or disturbance in the line such as would cause automatic operation of the system. This may be done by connecting conductor 34 with conductor 32 either by manually tripping any one of the relays 24 or by the provision of a special relay or switch.

From the foregoing, it will be seen the system is entirely automatic in action (except for resetting the same) and is in constant attendance on the supervised line, so that records may be obtained of faults which last for only very short periods, such as a fraction of a second. The records obtained include current differences and potential differences in the line as well as records of currents induced in adjacent lines. From these assembled records it is possible to calculate in known manner and with very nearly absolute accuracy the location of the fault.

While the invention is not limited to the types of instruments referred to nor to any method of calculating the location of a fault, it may be stated that recording instruments of the magnetizable removable core type each comprise a coil and a removable permanently magnetizable core therefor. When current flows in the instrument coils the cores become permanently magnetized and thus constitute records. After records have been made, the cores are removed and replaced by fresh unmagnetized cores. The magnetism of the removed cores is measured and the values obtained are factors in calculating the location of the fault.

Under conditions where the current transformers 17 and 18 are used to supply current for the usual line protection relays as well as for the fault locating system of this invention, the burden of the resistances 23 may affect the sensitivity of relay settings. This difficulty may be overcome by the means shown in Figure 2 in which an additional relay 41 having pairs of normally closed contacts is connected to short circuit the resistances 23, severally. The winding of this relay is connected between the conductors 34 and 35 in parallel with the winding of relay 22 so as to be energized under the same conditions as the relay 22. When energized, the relay 41 opens its contacts to permit current flow through the resistances and operation of the recording instruments 20. Thus, the burden of the resistances 23 will not be thrown on the current transformers until after the line protection relays have operated, thereby avoiding any interference with the normal operation of the line protection relays.

That embodiment of the invention which has been illustrated and described is adapted for supervising one transmission line from one end thereof. If desired, the entire fault locating arrangements may be duplicated at the other end of the line, as indicated by the showing of transformers 17ª, 18ª, 19ª and 25ª, to which may be connected recording instruments and other elements exactly as shown. By calculating the location of a fault from records made at both ends of the line, the chance of error is minimized. The installation shown may be enlarged to provide for locating faults in the line 12. In such an arrangement the transformers 18 are connected as shown for the transformers 17 and the circuit N' with its single recording instrument 20, rectifier 21 and resistance 23, is replaced by current circuits and instruments exactly as shown for the line 11. A single relay 22 may control both sets of current recorders, so that all will operate upon the occurrence of a fault in either line and thus afford the comparative records obtained from the circuit N'. The potential recording system shown may be common to the two lines or may be duplicated for the line 12. The unit of system shown may obviously be duplicated at the other end of the line 12. If a long transmission line is divided into sections, fault locating means as described may be located at the division points. It will be understood the system may be expanded by addition of as many units of the type described as there are transmission lines and that the system unit may contain a greater or lesser number of recording instruments according as the line served has more or less than three phases.

The system is applicable equally to lines transmitting direct current by replacing the transformers 17, 17a, 18, 18a, 25 and 25a with devices suitable for direct current and modifying the recording circuits accordingly, the rectifiers 21 and 28 being then unnecessary. The foregoing description has presupposed the use of recording instruments operating on direct current but it will be understood that instruments operating on alternating current may be used. In such case rectifiers are not necessary for lines transmitting alternating current but, if the lines transmit direct current, alternators would be required and may be regarded as equivalents of the rectifiers.

Having thus described my invention, what I claim is:

1. In a method of locating faults in an electric transmission line the combination of steps which comprises, making magnetic records representative of the currents flowing in each phase of a transmission line at the instant of fault, making magnetic records representative of the potential differences between phases and between each phase and neutral of the transmitted current at the instant of fault and obtaining factors for calculating location of a line fault by measuring the magnetism of the magnetic records.

2. In a method of locating faults in an electric transmission line the combination of steps which comprises, making magnetic records representative of the currents flowing in each phase of a transmission line at the instant of fault, making magnetic records representative of the potential differences between phases and between each phase and neutral of the transmitted current at the instant of fault, making magnetic records representative of currents induced in a line parallel to the faulted line by reason of the fault and obtaining factors for calculating location of a line fault by measuring the magnetism of the magnetic records.

3. A method according to claim 1 characterized in that the making of records is limited to a short period of time less than the duration of a transient fault in the line.

4. A method according to claim 1 characterized in that the making of records is commenced a fraction of a second after commencement of the fault and continued during less than one second of time, whereby surges of current and voltage at commencement of the fault are excluded from the records.

5. In a method of locating faults in an electrical transmission line the combination of steps which comprises, making separate records representative of the currents flowing in each phase of a transmission line at the instant of fault, and making records representative of the potential differences between phases and between each phase and neutral of the transmitted current at the instant of fault, at least one of said records being a permanent magnetic record and obtaining factors for calculating location of a line fault by measuring the magnetism of the magnetic records.

6. A system for locating faults in electric transmission lines which comprises a magnetic record making current recording instrument for each phase of the line and for the neutral, potential recording instruments for recording magnetic record making potential differences between the line phases and between each phase and neutral, means for connecting said recording instruments in operative relation with a line including normally open circuits for the recording instruments severally in which circuits current flow is directly responsive to line currents and voltages respectively, and means responsive to unbalancing of currents flowing in the line to cause closing of the recording instrument circuits and making magnetic records by said recording instruments.

7. A system for locating faults in electric transmission lines which comprises a magnetic record making current recording instrument for each phase of the line and for the neutral, magnetic record making potential recording instruments for recording potential differences between the line phases and between each phase and neutral, means for connecting said recording instruments in operative relation with a line including normally open circuits for the recording instruments severally in which circuits current flow is directly responsive to line currents and voltages respectively, and means responsive to unbalancing of currents flowing in the line to cause closing of the recording instrument circuits and making magnetic records by said recording instruments, and means rendered operative upon closing of the recording instrument circuits to cause opening of said recording instrument circuits after elapse of a predetermined period of time.

8. A system for locating faults in electric transmission lines which comprises a current recording instrument for each phase of the line and for the neutral, potential recording instruments for recording potential differences between the line phases and between each phase and neutral, normally open circuits connecting said recording instruments severally with the line, means for closing said recording instrument circuits, a control circuit adapted to energize said circuit closing means, and means responsive to unbalancing of currents flowing in the line to connect said instrument circuit closing means in the control circuit.

9. A system for locating faults in electric transmission lines which comprises a current recording instrument for each phase of the line and for the neutral, potential recording instruments for recording potential differences between the line phases and between each phase and neutral, normally open circuits connecting said recording instruments severally with the line, means for closing said recording instrument circuits, a control circuit adapted to energize said circuit closing means, means responsive to unbalancing of currents flowing in the line to connect said instrument circuit closing means in the control circuit, and means to cause opening of the recording instrument circuits after elapse of a predetermined time including a delay action relay having contacts in the powering circuit of said instrument circuit closing means, and a powering circuit for said relay adapted to be closed by said instrument circuit closing means.

10. A system for locating faults in electric transmission lines which comprises a current recording instrument for each phase of the line and for the neutral, potential recording instruments for recording potential differences between the line phases and between each phase and neutral, normally open circuits connecting said recording instruments severally with the line, means for closing said recording instrument circuits, a control circuit adapted to energize said circuit closing means, means responsive to unbalancing of currents flowing in the line to connect said instrument circuit closing means in the control circuit, means to cause opening of the recording instrument circuits after elapse of a predetermined time including a delay action relay having contacts in the powering circuit of said instrument circuit closing means, a powering circuit for said relay adapted to be closed by said instrument circuit closing means and a holding circuit adapted to maintain said delay action relay energized after opening of the recording instrument circuits whereby the recording instrument circuit closing means is maintained inoperative and the making of a second set of records is prevented until the system is manually restored, and means to open said holding circuit thereby to restore at the delay action relay the powering circuits of said recording instrument circuit closing means.

11. A system for locating faults in electric transmission lines which comprises a current recording instrument for each phase of the line and for the neutral, potential recording instruments for recording potential differences between the line phases and between each phase and neutral, normally open circuits connecting said recording instruments severally with the line, a relay having pairs of contacts in the current recording instrument circuits severally, a second relay having pairs of contacts in the potential recording instrument circuits severally, a control circuit, and relays responsive to unbalancing of currents in the line to connect the windings of said first and second relays across the control circuit.

12. In combination with a system according to claim 11, a timing relay having normally closed contacts in the powering circuit of said second relay, and a powering circuit for said timing relay adapted to be closed by operation of said second relay.

13. A system for locating faults in electric transmission lines which comprises a current transformer for each phase of the line, a current recording instrument for each line phase and for the neutral, a shunted resistance for each current recording instrument, fault detecting relays for the several phases of the line having their windings in series between the related transformers and recording instruments and in parallel closed series between the transformers and the related resistances, a relay having pairs of contacts in said recording instrument circuits, a control circuit for powering said last mentioned relay, said first mentioned relays having their contacts arranged to connect the winding of said second relay across the control circuit upon operation of any of said first relays by unbalancing of currents flowing in the line, whereby the recording instruments are connected to the transformers to record the unbalanced line currents.

14. A system for locating faults in electric transmission lines which comprises a current transformer for each phase of the line, a current recording instrument for each line phase and for the neutral, a shunted resistance for each current recording instrument, a potential transformer for each phase of the line, potential recording instruments for severally recording potential differences between the line phases and between each phase and neutral, a resistance in series with each potential recorder, fault detecting relays for the several phases of the line having their windings in series between the related current transformers and current recorders, a current recorder relay having pairs of contacts in series with said current recorders and said detecting relays, a potential recorder relay having pairs of contacts in series with the potential transformers and potential recorders, a control circuit for powering said current recorder relay and said potential recorder relay, the contacts of said detector relays being arranged to connect the windings of said current recorder relay and of said potential recorder relay across the control circuit upon operation of any of said detector relays by unbalancing of currents flowing in the line.

15. In combination with a system according to claim 14, a delay action relay having normally closed contacts in series with the windings of said current recorder relay and said potential recorder relay and a powering circuit connecting the winding of said delay action relay across the control circuit and including a pair of contacts in one of said recorder relays whereby upon energization of the recorder relays and recorders said delay action relay is energized to open the circuits of the recorder relays after elapse of a predetermined time period.

16. A system according to claim 13 including a third relay having pairs of normally closed contacts connected to short circuit the resistances, said relay having its winding connected in parallel with said second relay across the control circuit.

17. A system for locating faults in electric transmission lines which comprises a magnetic record making current recording instrument for each phase of the line and for the neutral, magnetic record making potential recording instruments for recording potential differences between the line phases and between each phase and neutral, means for connecting said recording instruments in operative relation with a line including normally open circuits for the recording instruments severally, and means responsive to unbalancing of currents flowing in the line to cause closing of the recording instrument circuits and making of magnetic records by said instruments.

18. A system for locating faults in electric transmission lines which comprises a magnetic record making current recording instrument for each phase of the line and for the neutral, magnetic record making potential recording instruments for recording potential differences between the line phases and between each phase and neutral, means for connecting said recording instruments in operative relation with a line including normally open circuits for the recording instruments severally, and means responsive to unbalancing of currents flowing in the line to cause closing of the recording instrument circuits and making of magnetic records by said instruments, and means rendered operative upon closing of the recording instrument circuits to cause opening of said recording instrument circuits after elapse of a predetermined period of time.

19. A system for locating faults in electric transmission lines which comprises a magnetic record making current recording instrument for each phase of the line and for the neutral, magnetic record making potential recording instruments for recording potential differences between the line phases and between each phase and neutral, normally open circuits connecting said recording instruments severally with the line, means for closing said recording instrument circuits, a control circuit adapted to energize said circuit closing means, and means responsive to unbalancing of currents flowing in the line to connect said instrument circuit closing means in the control circuit.

20. A system for locating faults in electric transmission lines which comprises a magnetic record making current recording instrument for each phase of the line and for the neutral, magnetic record making potential recording instruments for recording potential differences between the line phases and between each phase and neutral, normally open circuits connecting said recording instruments severally with the line, means for closing said recording instrument circuits, a control circuit adapted to energize said circuit closing means, means responsive to unbalancing of currents flowing in the line to connect said instrument circuit closing means in the control circuits, and means to cause opening of the recording instrument circuits after elapse of a predetermined time including a delay action relay having contacts in the powering circuit of said instrument circuit closing means, and a powering circuit for said relay adapted to be closed by said instrument circuit closing means.

21. A system for locating faults in electric transmission lines which comprises a magnetic record making current recording instrument for each phase of the line and for the neutral, magnetic record making potential recording instruments for recording potential differences between the line phases and between each phase and neutral, normally open circuits connecting said recording instruments severally with the line, a relay having pairs of contacts in the current recording instrument circuits severally, a second relay having pairs of contacts in the potential recording instrument circuits severally, a control circuit, and relays responsive to unbalancing of currents in the line to connect the windings of said first and second relays across the control circuit.

22. A system for locating faults in electric transmission lines which comprises a current recording instrument for each phase of the line and for the neutral, potential recording instruments for recording potential differences between the line phases and between each phase and neutral, circuits connecting said recording instruments severally with the line, including means controlling energization of the instruments, a control circuit adapted to energize said controlling means, means to cause deenergization of the recording instruments after elapse of a predetermined time including a delay action relay having contacts in the powering circuit of said controlling means, a powering circuit for said relay adapted to be closed by said controlling means and a holding circuit adapted to maintain said delay action relay energized after de-energization of the recording instruments whereby the controlling means is maintained inoperative and the making of a second set of records is prevented until the system is manually restored, and means to open said holding circuit thereby to restore at the delay action relay the circuits of said controlling means.

23. A system for locating faults in electric transmission lines which comprises a current recording instrument for each phase of the line and for the neutral, potential recording instruments for recording potential differences between the line phases and between each phase and neutral, circuits connecting said recording instruments severally with the line including means for controlling energization of said recording instruments, a control circuit adapted to energize said controlling means, means responsive to unbalancing of currents flowing in the line to connect said instrument controlling means in the control circuit, means to cause deenergization of the recording instruments after elapse of a predetermined time including a delay action relay having contacts in the powering circuit of said instrument controlling means, a powering circuit for said relay adapted to be closed by said instrument controlling means and a holding circuit adapted to maintain said delay action relay energized after de-energization of the recording instruments whereby the controlling means is maintained inoperative and the making of a second set of records is prevented until the system is manually restored, and means to open said holding circuit thereby to restore at the delay action relay the powering circuits of said controlling means.

24. A system for locating faults in electric transmission lines which comprises a current transformer for each phase of the line, a current recording instrument for each line phase and for the neutral, a shunted resistance for each current recording instrument, a potential transformer for each phase of the line, potential recording instruments for severally recording potential differences between the line phases and between each phase and neutral, a resistance in series with each potential recorder, fault detecting relays for the several phases of the line having their windings in series between the related current transformers and current recorders, a current recorder relay controlling operation of said current recorders and said detecting relays, a potential recorder relay controlling operation of the potential recorders, a control circuit for powering said current recorder relay and said potential recorder relay, the contacts of said detector relays being arranged to connect the windings of said current recorder relay and of said potential recorder relay across the control circuit upon operation of any of said detector relays by unbalancing of currents flowing in the line.

25. Means for locating faults in electrical transmission lines including current and potential transformers connected to the line, current and potential recording instruments in series with the secondaries of said transformers, resistances in operative relation to said recorders, a control circuit including a relay controlling current flow through said recorders and resistances and means for automatically de-energizing said relay after operation of the recorders to maintain them inoperative until the recorders are reset and manual means for de-energizing said relay.

26. Means for locating faults in electrical transmission lines including current and potential transformers connected to the line, current and potential recording instruments in series with the secondaries of said transformers, resistances in operative relation to said recorders, a control circuit including a relay connected to normally short circuit said resistances.

EDWARD W. KNAPP.